United States Patent
MacKay et al.

(10) Patent No.: US 11,502,746 B2
(45) Date of Patent: Nov. 15, 2022

(54) POWER OPTIMIZATION OF POINT-TO-POINT OPTICAL SYSTEMS WITHOUT VISIBILITY OF INTERMEDIATE SYSTEM PARAMETERS

(71) Applicant: Ciena Corporation, Hanover, MD (US)

(72) Inventors: Alex W. MacKay, Ottawa (CA); Priyanth Mehta, Ottawa (CA); Andrew Kam, Ottawa (CA); David W. Boertjes, Nepean (CA)

(73) Assignee: Ciena Corporation, Hanover, MD (US)

( * ) Notice: Subject to any disclaimer, the term of this patent is extended or adjusted under 35 U.S.C. 154(b) by 11 days.

(21) Appl. No.: 17/134,840

(22) Filed: Dec. 28, 2020

(65) Prior Publication Data

US 2022/0209863 A1 Jun. 30, 2022

(51) Int. Cl.
*H04B 10/077* (2013.01)
*H04B 10/80* (2013.01)
*H04J 14/02* (2006.01)

(52) U.S. Cl.
CPC ......... *H04B 10/0775* (2013.01); *H04B 10/80* (2013.01); *H04J 14/0221* (2013.01)

(58) Field of Classification Search
None
See application file for complete search history.

(56) References Cited

U.S. PATENT DOCUMENTS

| | | |
|---|---|---|
| 6,618,193 B1 | 9/2003 | Boertjes |
| 8,364,036 B2 | 1/2013 | Boertjes et al. |
| 8,509,618 B2 | 8/2013 | Boertjes et al. |
| 8,509,621 B2 | 8/2013 | Boertjes et al. |
| 8,554,074 B2 | 10/2013 | Boertjes et al. |
| 8,750,706 B2 | 6/2014 | Boertjes et al. |
| 8,958,696 B2 | 2/2015 | Boertjes et al. |
| 9,077,474 B2 | 7/2015 | Boertjes et al. |
| 9,577,763 B2 | 2/2017 | Al Sayeed et al. |
| 9,628,189 B2 | 4/2017 | Châtelain et al. |
| 9,634,791 B2 | 4/2017 | Boertjes et al. |
| 9,729,265 B2 | 8/2017 | Hurley et al. |

(Continued)

FOREIGN PATENT DOCUMENTS

| | | |
|---|---|---|
| EP | 2 993 806 A1 | 3/2016 |
| WO | 2002/082706 A2 | 10/2002 |

(Continued)

*Primary Examiner* — David W Lambert
(74) *Attorney, Agent, or Firm* — Clements Bernard Baratta; Lawrence A. Baratta, Jr.; Christopher L. Bernard (57) ABSTRACT

Systems and methods include responsive to transmission of a power spectral density input into an optical system with one or more probe signals, obtaining first measurements of a performance metric of each of the one or more probe signals at an output of the optical system while the one or more probe signals are moved across a band of optical spectrum; responsive to causing power perturbations across the band, obtaining second measurements of the performance metric of each of the one or more probe signals at the output of the optical system while the one or more probe signals are moved across the band; analyzing the performance metric as a function of power utilizing the first measurements and the second measurements; and utilizing results from the analyzing to optimize the performance metric in the optical system.

20 Claims, 8 Drawing Sheets

(56) References Cited

U.S. PATENT DOCUMENTS

| | | | |
|---|---|---|---|
| 9,806,803 | B2 | 10/2017 | Bownass et al. |
| 9,831,947 | B2 | 11/2017 | Boertjes |
| 9,831,977 | B2 | 11/2017 | Boertjes et al. |
| 9,973,295 | B2 | 5/2018 | Al Sayeed et al. |
| 10,236,981 | B2 | 3/2019 | Harley et al. |
| 10,237,011 | B2 | 3/2019 | Al Sayeed et al. |
| 10,277,311 | B2 | 4/2019 | Archambault et al. |
| 10,361,957 | B1 | 7/2019 | MacKay et al. |
| 10,404,365 | B2 | 9/2019 | Frankel et al. |
| 10,455,300 | B2 | 10/2019 | Swinkels et al. |
| 10,461,880 | B2 | 10/2019 | Boertjes et al. |
| 10,536,235 | B2 | 1/2020 | Al Sayeed et al. |
| 10,587,339 | B1 | 3/2020 | Al Sayeed et al. |
| 10,680,739 | B2 | 6/2020 | Swinkels et al. |
| 10,715,888 | B2 | 7/2020 | Swinkels et al. |
| 10,784,980 | B2 | 9/2020 | Roberts et al. |
| 10,784,981 | B2 | 9/2020 | Boertjes et al. |
| 10,826,641 | B1 * | 11/2020 | Al Sayeed ....... H04B 10/07955 |
| 2003/0042402 | A1 | 3/2003 | Boertjes et al. |
| 2004/0151426 | A1 | 8/2004 | Boertjes et al. |
| 2007/0212064 | A1 | 9/2007 | Boertjes et al. |
| 2015/0229404 | A1 | 8/2015 | Boertjes |
| 2015/0229528 | A1 | 8/2015 | Swinkels et al. |
| 2015/0333864 | A1 * | 11/2015 | Swinkels ........... H04B 10/0795 398/79 |
| 2016/0080084 | A1 | 3/2016 | Boertjes et al. |
| 2017/0207849 | A1 * | 7/2017 | Sinclair .............. H04B 10/0795 |
| 2017/0310392 | A1 * | 10/2017 | Boertjes ............. H04Q 11/0062 |
| 2018/0239522 | A1 | 8/2018 | Campbell et al. |
| 2018/0343078 | A1 * | 11/2018 | Roberts ............. H04B 10/2543 |
| 2018/0359029 | A1 | 12/2018 | Shiner et al. |
| 2019/0253361 | A1 * | 8/2019 | MacKay ............... H04L 41/147 |
| 2020/0076499 | A1 | 3/2020 | Al Sayeed et al. |
| 2020/0348181 | A1 | 11/2020 | Pei et al. |

FOREIGN PATENT DOCUMENTS

| | | |
|---|---|---|
| WO | 2010/012100 A1 | 2/2010 |
| WO | 2018/215850 A1 | 11/2018 |
| WO | 2020/198574 A1 | 10/2020 |

* cited by examiner

POWER OPTIMIZATION OF POINT-TO-POINT OPTICAL SYSTEMS WITHOUT VISIBILITY OF INTERMEDIATE SYSTEM PARAMETERS

FIELD OF THE DISCLOSURE

The present disclosure generally relates to fiber optics. More particularly, the present disclosure relates to systems and methods for power optimization of point-to-point Dense Wavelength Division Multiplexing (DWDM) systems without visibility of intermediate system parameters.

BACKGROUND OF THE DISCLOSURE

As described herein and known in the art, an optical system includes one or more transmitters which transmit optical channels over an optical fiber and are received at one or more receivers. This enables data transmission over a distance, and there can be various intermediate components in the optical system, including, e.g., optical amplifiers, Variable Optical Attenuators (VOAs), gain flattening filters, etc. There is visibility of the optical channels at various points along the optical fiber in a typical integrated solution, e.g., via Optical Channel Monitors (OCMs), power monitors, etc. There are various examples where an optical system is not an integrated solution, and these are referred to herein as a foreign line system. Here, the transmitters and receivers are connected to a "black box" system where all visible channels are the transmitted channels at the transmitters and the received channels at the receivers. Examples of such systems include submarine systems (where the submarine line system is from one vendor and the optical transceivers or modems are from another vendor), disaggregated optical systems (in terrestrial deployments where similarly the optical line system is from a different vendor as the optical transceivers or modems, e.g., "alien wavelengths," and the like. A disadvantage of such systems is knowledge of intermediate system parameters is unknown or inaccessible to traffic carrying channels. Intermediate system parameters can include but are not limited to channel powers, Signal-to-Noise Ratio (SNR), Noise-to-Signal Ratio (NSR), Optical SNR (OSNR), frequency-dependent powers, gains, losses, and noise figures, etc. at any point within the system other than at the transmit and receive ends.

BRIEF SUMMARY OF THE DISCLOSURE

The present disclosure relates to systems and methods for power optimization of point-to-point Dense Wavelength Division Multiplexing (DWDM) systems including arbitrarily frequency-spaced flexible grid systems, such as foreign line systems where intermediate system parameters are unknown or inaccessible to traffic carrying channels. The present disclosure enables determination of how the system output parameters (e.g., SNR, power, etc.) change with input variables (e.g., power) without making any assumptions about the theoretical system behavior (linear or nonlinear). By using finite difference methods, this allows the construction of an appropriate Jacobian matrix to describe how the system output SNR (or another variable) will change with any input power perturbation. This approach can maximize realizable system capacity on a black box optical system with or without alien wavelengths. The present disclosure enables determining which channels to perturb in input power and how much to yield the greatest benefit in terms of total capacity considering the actual required SNR gap between modulation formats.

In an embodiment, a method includes steps and a non-transitory computer-readable medium includes instructions stored thereon for programming a controller to perform the steps. The steps include, responsive to transmission of a power spectral density input into an optical system with one or more probe signals, obtaining first measurements of a performance metric of each of the one or more probe signals at an output of the optical system while the one or more probe signals are moved across a band of optical spectrum; responsive to causing power perturbations across the band, obtaining second measurements of the performance metric of each of the one or more probe signals at the output of the optical system while the one or more probe signals are moved across the band; analyzing the performance metric as a function of power utilizing the first measurements and the second measurements; and utilizing results from the analyzing to optimize the performance metric in the optical system.

The performance metric can include any of end-to-end channel powers, Signal-to-Noise Ratio (SNR), Noise-to-Signal Ratio (NSR), Bit Error Rate (BER), Q, and Mean Squared Error (MSE). The performance metric can relate to Signal-to-Noise Ratio (SNR), and wherein the utilizing includes determining approximate power change per channel to increase margin to a next available capacity; and determining net system performance impact across all channels based on the approximate power change. The performance metric can relate to Signal-to-Noise Ratio (SNR), and wherein the utilizing includes upshifting a channel when SNR for its adjacent channels are above a target SNR after a power change that is required for the upshifting. The utilizing can further include repeating the upshifting across the band where possible.

Intermediate system parameters of the optical system can be unknown or inaccessible, and wherein the intermediate system parameters related to an intermediate system that connects one node to another node and includes one or more optical amplifiers. The optical system can include a submarine system with a wet plant. The optical system can include a foreign line system.

In another embodiment, an optical network includes at least one modem connected to a multiplexer connected to an optical system; and a controller configured to cause transmission of a power spectral density input into the optical system with one or more probe signals from the at least one modem, obtain first measurements of a performance metric of each of the one or more probe signals at an output of the optical system while the one or more probe signals are moved across a band of optical spectrum, cause power perturbations across the band, obtain second measurements of the performance metric of each of the one or more probe signals at the output of the optical system while the one or more probe signals are moved across the band during the power perturbations, analyze the performance metric as a function of power utilizing the first measurements and the second measurements, and utilize results from the analyzing to optimize the performance metric in the optical system.

BRIEF DESCRIPTION OF THE DRAWINGS

The present disclosure is illustrated and described herein with reference to the various drawings, in which like reference numbers are used to denote like system components/method steps, as appropriate, and in which:

FIG. 9 is a graph of $$\frac{deSNR(f)}{dP(f_o)}$$

over frequency;

DETAILED DESCRIPTION OF THE DISCLOSURE

Again, the present disclosure relates to systems and methods for power optimization of point-to-point Dense Wavelength Division Multiplexing (DWDM) systems including arbitrarily frequency-spaced flexible grid systems, such as foreign line systems where intermediate system parameters are unknown or inaccessible to traffic carrying channels. The present disclosure enables determination of how the system output parameters (e.g., SNR, power, etc.) change with input variables (e.g., power) without making any assumptions about the theoretical system behavior (linear or nonlinear). By using finite difference methods, this allows the construction of an appropriate Jacobian matrix to describe how the system output SNR (or another variable) will change with any input power perturbation. This approach can maximize realizable system capacity on a black box optical system with or without alien wavelengths. The present disclosure enables determining which channels to perturb in input power and how much to yield the greatest benefit in terms of total capacity considering the actual required SNR gap between modulation formats.

Optical System

Figure 1:
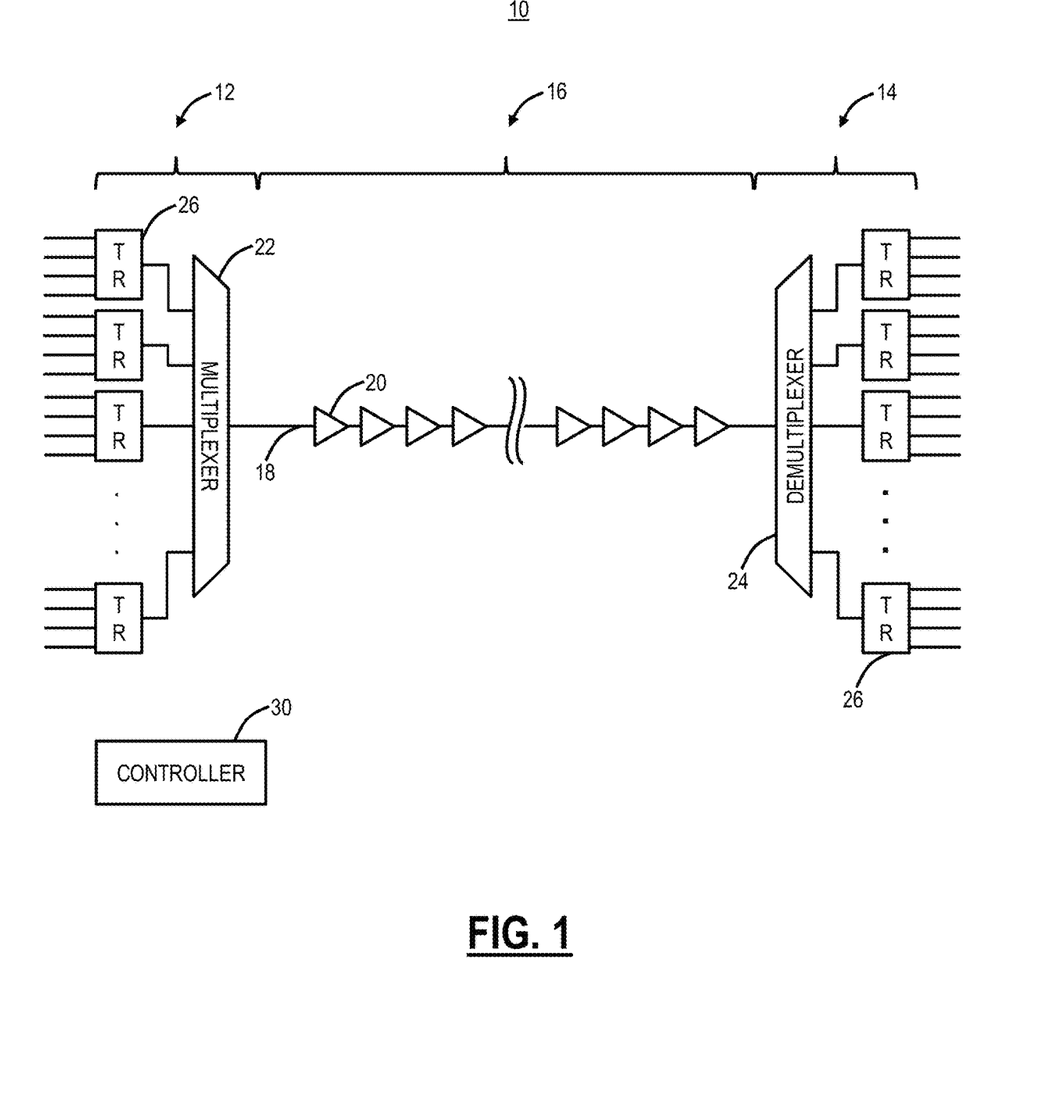
FIG. 1 is a network diagram of an example optical system.

FIG. 1 is a network diagram of an example optical system 10. For illustration purposes, the example optical system 10 is shown with a single direction from a first node 12 to a second node 14. The example optical system 10 generally includes, from a topology perspective, the nodes 12, 14, an intermediate system 16, and an optical fiber 18 interconnecting the nodes 12, 14. Of course, a practical embodiment will include the opposite direction, but the techniques described herein focus on a single direction of propagation through optical fiber 18. The intermediate system 16 can include one or more intermediate optical amplifiers 20. The nodes 12, 14 are terminals and can include optical multiplexers 22, demultiplexers 24, and transceivers/transponders/modems 26. The objective of the optical system 10 is to transmit data from the node 12, via the modems 26, to the node 14. In an embodiment, the optical system 10 is a foreign line system where the nodes 12, 14 have no knowledge or visibility of intermediate system parameters at various points along the intermediate system 16. In another embodiment, the optical system 10 is a submarine system where the nodes 12, 14 are terminal stations and the intermediate system 16 is a wet plant, each being from different vendors. A controller 30 can communicate with the nodes 12, 14, for obtaining data related to operation of the modems 26, such as setting the power at the transmit side at the node 12 and obtaining received power and other performance metrics, e.g. bit-error-ratio, signal-to-noise ratio, etc. at the receive side the node 14.

The optical system 10 can also be referred to as a section or an Optical Multiplex Section (OMS). The present disclosure contemplates operation on the fiber 18 in a section, i.e., a point-to-point system, i.e., all channels transmitted at the ingress are received at the egress.

System Optimization

In system optimization with visibility and/or control of intermediate system parameters in the intermediate system 16, it is possible to model how the optical system 10 will behave, and various actuators can be modified in the optical system 10 to adjust the power of individual channels or the aggregate of channels, gain of the optical amplifiers 20, attenuation of VOAs, etc. in different places. However, without knowledge of the intermediate system parameters and how they depend on other variable parameters in the optical system 10, it is extremely challenging to optimize around a given performance metric such as capacity. Global capacity optimization is a highly-complex nonlinear function dependent on Stimulated Raman Scattering (SRS), Spectral Hole Burning (SHB), Kerr nonlinearity, and how these nonlinear effects interact with various lumped and distributed linear transfer functions throughout the path such as fixed filters and Wavelength Dependent Loss (WDL). Even powerful modeling tools cannot help when there is no knowledge of intermediate system parameters (e.g., Raman coefficient of a given span in the intermediate system 16, or how much fixed attenuation tilt there is on a gain flattening filter in the middle of the intermediate system 16).

The present disclosure provides a novel real-time process for determining optimal power settings at the transmit side to achieve capacity maximization and margin equalization when the intermediate system parameters' knowledge is unknown or inaccessible. The present disclosure includes defining and monitoring an end-to-end system transfer function evolution with changes at the transmit side of the optical system 10. This transfer function can determine the optimal control schemes required under arbitrary fill conditions (i.e., how many optical channels are equipped). Each frequency component's performance in a band can be predicted before any change to the optical system 10 occurs, such as channel adds and/or deletes. As described herein, a band is a group of spectrum in the optical system 10, such as, e.g., the C-band (e.g., about 1528 nm to 1560 nm).

Definitions

All of the following parameters are defined in linear (non-logarithmic) units.

NSR: the noise-to-signal ratio (NSR) which would yield a given pre-forward error correction (FEC) bit-error-ratio (BER) assuming additive white Gaussian noise which includes all modem/system impairments (i.e., can be determined directly from a BER-to-NSR conversion), this NSR can be given as approximately $$NSR = \frac{1}{EC}(NSR_{imp} + NSR_{ASE} + NSR_{NLI})$$

EC: eye closure; assumed to be measurable for a given modem 26.

$NSR_{imp}$: the NSR impairment due to modem implementation noise; assumed to be approximately measurable for a given modem pair.

$NSR_{ASE}$: the NSR impairment due to amplified spontaneous emission (ASE) which should approximately be measurable with an Optical Spectrum Analyzer (OSA).

$NSR_{NLI}$: the effective noise penalty due to nonlinear interference.

$SNR_X$: the inverse of any $NSR_X$.

$\Delta NSR_M$: the incremental NSR margin (amount of additional penalty that is tolerable) before FEC failure.

RNSR: the NSR at the pre-FEC BER threshold before the onset of FEC failure.

$$RNSR = NSR + \Delta NSR_M$$

$RNSR_A$: the measurable ASE NSR at the threshold before FEC failure.

$$RNSR_A = NSR_A + \Delta NSR_M$$

M: the margin of signal to noise ratio available before FEC failure.

$$M = \frac{SNR}{RSNR} = \frac{RNSR}{NSR} = 1 + \frac{\Delta NSR_M}{NSR}$$

$M_A$: the margin of ASE signal to noise ratio available before FEC failure.

$$M_A = \frac{SNR_A}{RSNR_A} = \frac{RNSR_A}{NSR_A} = 1 + \frac{\Delta NSR_M}{NSR_A}$$

Assumptions

Assume it is possible to measure i) power as a function of frequency at the input and output of the optical system 10, and ii) SNR as a function of frequency at the input and output to the optical system 10 (from the modem 26 BER).

Assume it is possible to vary the power of individual channels at the input of the optical system 10, which will affect the power and SNR of all channels at the output of the optical system 10.

The modems 26 can also be configured to vary the channel's baud rate to change the required SNR for a given line rate.

It is assumed that it is possible to approximately measure local derivatives of the optical system 10 response as a function of power using finite differences. As an example, it is possible to approximately measure the response in power or SNR of any channel at the output of the optical system 10 in response to a power change of one channel at the input to the optical system 10:

$$\frac{\partial SNR_{out}(v_y)}{\partial P_{in}(v_x)} \approx \frac{SNR_{out}(v_y, P_{in}(v_x) + \Delta P) - SNR_{out}(v_y, P_{in}(v_x))}{\Delta P}$$

Brief Theoretical Background

For a given channel, the theoretical capacity can be given by the Shannon-Hartley theorem considering a dual-polarization signal (i.e., one which can carry information on orthogonal polarizations):

$$C = 2B \cdot \log_2(\Gamma \cdot SNR + 1)$$

Where C=theoretical channel capacity (Gb/s), B=signal baud rate (GHz), $\Gamma$=FEC coding gap, and SNR=linear signal to noise ratio. And the theoretical system capacity is given as the sum of the capacity of each channel within the system:

$$C_{syst} = \sum_k C_k$$

To simplify what is to follow, the following assumptions are further made about the channels:

1) operating in a moderately high SNR regime such that the +1 term can be ignored,
2) the coding gap is approximately the same across modulation formats, and
3) Baud is initially constant on all channels.

Note that none of the above assumptions are required for a general derivation. Rather, these are made to simplify the description (first two assumptions), and so that the description can be done in terms of capacity. A representation in spectral-efficiency space would require another integration at the end to get back to capacity-space and is less intuitive (last assumption). The performance penalty from the derivation here compared to a general derivation is negligible in practical use cases.

Under the above assumptions, the capacity available of a channel is given by:

$$C \approx K_1 + K_2 \cdot SNR_{dB}$$

Where $$K_1 = 2B \cdot \log_2 \Gamma$$

$$K_2 = \frac{B}{5 \cdot \log_{10} 2}$$

$$SNR_{dB} = 10 \log_{10} SNR.$$

And the total system capacity available can then be rewritten as:

$$C_{syst} = N \cdot K_1 + K_2 \cdot \sum_{k=1}^{N} SNR_{dB,k}$$

Where N is the number of channels in the system. At this point, note that all terms except the sum of SNRs in dB are constant values, and therefore to maximize the system capacity, the objective function is simply to maximize the sum of SNRs in dB or any other logarithmic unit, or equivalently to minimize the sum of NSRs in dB.

In a practical system, there may not be access to a sensible channel capacity for any analog SNR value, so the present disclosure also addresses discretized capacities at discrete required SNRs An aspect of the present disclosure is that the techniques can operate on a completely black box system. There are existing proposals which make assumptions about how certain intermediate system properties will change given changes in the input variables, but the present disclosure only assumes that the objective function is close enough to convex that it will converge to a local optimum which will be at or very close to the global optimum. This has been validated by work in Ian Roberts, Joseph M. Kahn, and David Boertjes, "Convex Channel Power Optimization in Nonlinear WDM Systems Using Gaussian Noise Model," J. Lightwave Technol. 34, 3212-3222 (2016), the contents are incorporated by reference herein, from simulations considering different network conditions and in limited laboratory experiments.

The objective function is a maximum capacity under a minimum margin restraint; therefore, applying these techniques to a mixture of foreign (alien) wavelengths and vendor-specific wavelengths, etc. In the extreme event, it is possible to perform this optimization routine on a purely alien wavelength-based network. In any event, these techniques can be (typically would be) implemented by control at a multiplexer Wavelength Selective Switch (WSS) rather than on the Tx themselves, and therefore not visible by alien wavelengths.

The intent is to possibly increase SNR on one channel (or few), possibly at the expense of other surrounding channels. But only if one improved channel crosses the next capacity increase threshold while remaining channels do NOT drop below capacity decrease thresholds. Also, it can certainly be more than a few over the entire band.

Black Box Capacity Optimization Process

Figure 2:
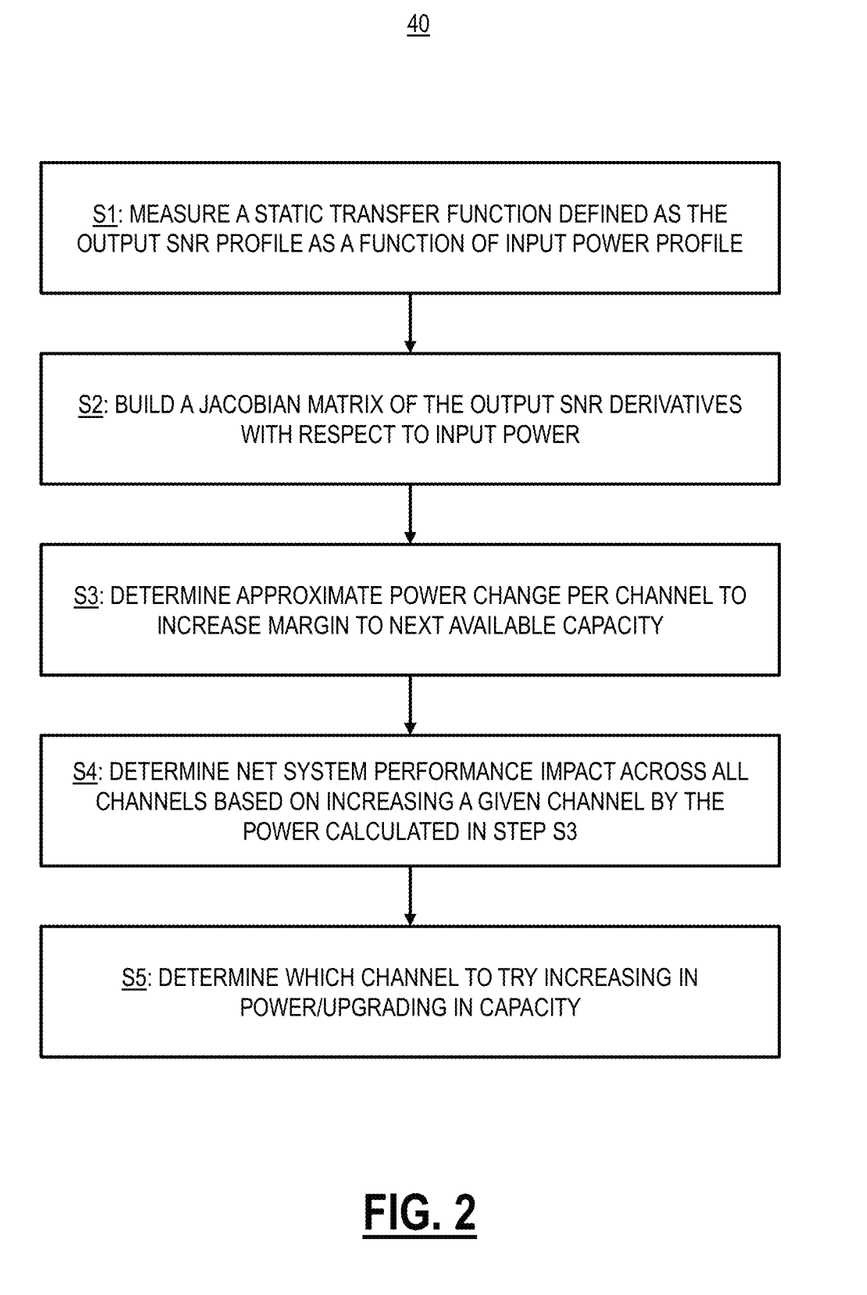
FIG. 2 is a flowchart of a black box optimization process.

FIG. 2 is a flowchart of a black box optimization process 40. The black box optimization process 40 can be implemented as a method including steps, via the controller 30 executing the steps, and as a non-transitory computer-readable medium having instructions stored thereon for programming a computer or other type of processing device to perform the steps. All units below are assumed to be logarithmic based (e.g., dB or dBm) unless explicitly stated otherwise.

Figure 3:
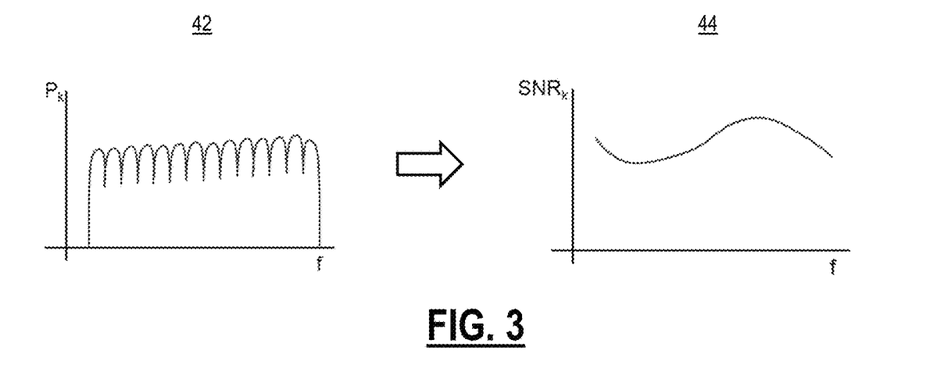
FIG. 3 is a graph of PSD over frequency (f) on an input and a graph of Signal-to-Noise Ratio (SNR) over frequency (f) at the output.

The process 40 begins by measuring a static transfer function defined as the output SNR profile as a function of the input power profile (step S1). This is done by launching an arbitrary power spectrum as input into the black box optical system 10, which for simplicity would typically be flat in Power Spectral Density (PSD) on the first iteration, and fully filling the band(s) of interest. This requires at least one real multi-rate transceiver at the target technology level (i.e., an optical modem 26) to act as a probe, and some other representative power source, such as Amplified Spontaneous Emission (ASE), but ideally would include modems 26 at approximately the anticipated bandwidth and positions if this is approximately known in advance. In the first iteration, the probe channel(s) would operate at the best-guessed modulation format, which is guaranteed to work on the optical system 10 based on first-order modeling. The probe channel(s) would be moved to different frequencies maintaining the PSD shape of the spectrum, and monitoring the output effective SNR (eSNR but will just use SNR in what follows), which can be reported by the modem 26 or derived from the pre-FEC BER, thus comprising the transfer function of the optical system 10 given the current input PSD state. For the $i^{th}$ channel on the $k^{th}$ iteration (iteration maps to the current state of the system), designate the SNR in units of dB as $SNR_{i,k}$ or to show the entire array of all channel SNRs on the $k^{th}$ iteration, write $\overline{SNR_k}$. FIG. 3 is a graph 42 of PSD over frequency (f) on an input and a graph 44 of SNR over frequency (f) at the output.

It is assumed the required SNR (RSNR) of the modem 26 is known at every modulation format, which is supported. The modified net system margin is defined as the margin after accounting for the minimum required margin, such that a value of 0 dB would mean having met the minimum RSNR budgeting in the minimum required margin.

Figure 4:
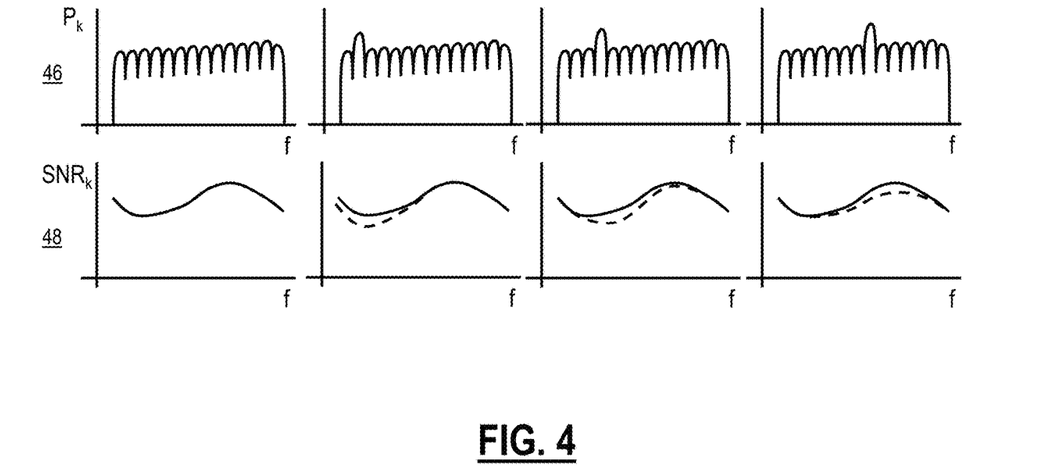
FIG. 4 are various graphs of PSD over frequency (f) at the input with various channel's power perturbed, and graphs of the corresponding SNR over frequency (f) at the output.

The process 40 includes building a Jacobian matrix of the output SNR derivatives with respect to input power (step S2). Specifically, a transfer function is iteratively generated for the optical system 10 to determine how to adjust the transmit channel powers in order to achieve the optimal power conditions at each frequency within the band to maximize capacity. The transfer function for a given iteration is achieved by the evaluation of the individual channel's partial derivatives and their response to power perturbations across the band. The process builds a Jacobian matrix as follows:

$$\overline{\frac{\partial SNR}{\partial P}} = \begin{bmatrix} \frac{\partial SNR_1}{\partial P_1} & \frac{\partial SNR_1}{\partial P_2} & \cdots & \frac{\partial SNR_1}{\partial P_N} \\ \frac{\partial SNR_2}{\partial P_1} & \frac{\partial SNR_2}{\partial P_2} & \cdots & \frac{\partial SNR_2}{\partial P_N} \\ \vdots & \vdots & \ddots & \vdots \\ \frac{\partial SNR_N}{\partial P_1} & \frac{\partial SNR_N}{\partial P_2} & \cdots & \frac{\partial SNR_N}{\partial P_N} \end{bmatrix}$$

Where $$\frac{\partial SNR_m}{\partial P_n}$$

is the relationship or me $m^{th}$ channel's output SNR as a function of an $n^{th}$ channel's input power as shown in FIG. 4 which are various graphs 46 of PSD over frequency (f) at the input with various channel's power perturbed, and graphs 48 of the corresponding SNR over frequency (f) at the output.

With step S2, the Jacobian matrix characterizes the performance as it relates to theoretical achievable capacity of the black box optical system 10 without requiring intermediate system parameters of the intermediate system 16. Intermediate system parameters can include WDL, loss, gain settings, etc. The present disclosure can be blind to these parameters. Note, normally these are required to do this sort of optimization. The present disclosure goes to the final answer on the black box without having to see inside of it (by probing the net response of the system to carefully chosen perturbations). The Jacobian matrix describes how the system output SNR (or another variable) will change with any input power perturbation. The following steps S3-S5 describe using the Jacobian matrix to optimize system capacity.

The process 40 includes determining the approximate power change per channel to increase the margin to the next available capacity (step S3). The diagonal components of the Jacobian, represented as $$\frac{\overline{\partial SNR_i}}{\partial P_i}$$

describe each channel's derivative of output SNR relative to changes in its own power.

$$\frac{\overline{\partial SNR_i}}{\partial P_i} = \left(\frac{\overline{\partial SNR}}{\partial P}\right) = \begin{bmatrix} \frac{\partial SNR_1}{\partial P_1} \\ \frac{\partial SNR_2}{\partial P_1} \\ \vdots \\ \frac{\partial SNR_N}{\partial P_N} \end{bmatrix}$$

Solve for the array $\overline{\delta P}$:

$$\overline{SNR_k} + \frac{\overline{\partial SNR_i}}{\partial P_t} \cdot \overline{\delta P} - \overline{RSNR_{k+1}} = 0$$

Where the dot operator is an element-wise multiplication and k is the current state of the optical system 10 regarding the modulation formats in use, i.e., $\overline{RSNR_k}$ is the RSNR array of each channel at their current modulation format and $\overline{RSNR_{k+1}}$ is the RSNR array of each channel operating at the next available modulation format where the next available modulation format would represent an increase in capacity with respect to the current modulation format per channel. The array $\overline{\delta P}$ related to the diagonal components tells approximately how much one would need to change the power on each channel to increase the SNR enough to get to the next available line rate, assuming none of the other channels are changing in power and the derivative for the $j^{th}$ channel of $$\frac{\partial SNR_j}{\partial P_j}$$

is approximately constant over a power change of $\delta P_j$.

The process 40 includes determining net optical system 10 performance impact across all channels based on increasing a given channel by the power calculated in step S3 (step S4). The net system performance impact on all other channels due to the perturbation $\delta P_j$ is given by the sum of all SNRs affected by the power of the $j^{th}$ channel. Calculate the vector $\overline{\delta SNR}$, where the $j^{th}$ element is given by:

$$\delta SNR_j = \delta P_j \cdot \sum_{i \neq j} \frac{\partial SNR_i}{\partial P_j}$$

This vector gives the approximate net performance impact on all other channels due to a power perturbation of $\delta P_j$ on the $j^{th}$ channel.

The process 40 includes determining which channel to try increasing in power or upgrading in capacity (step S5). Channels eligible for increased capacity can be ordered to prioritize those which would have the smallest net performance impact on other channels, i.e., prioritize smallest $\delta SNR_j$, and achieve $$\overline{SNR_k} + \frac{\overline{\partial SNR_i}}{\partial P_t} \cdot \overline{\delta P} = \overline{RSNR_{k+1}}$$

for the zero margin case.

Net System Margin (NSM) Process

Figure 5:
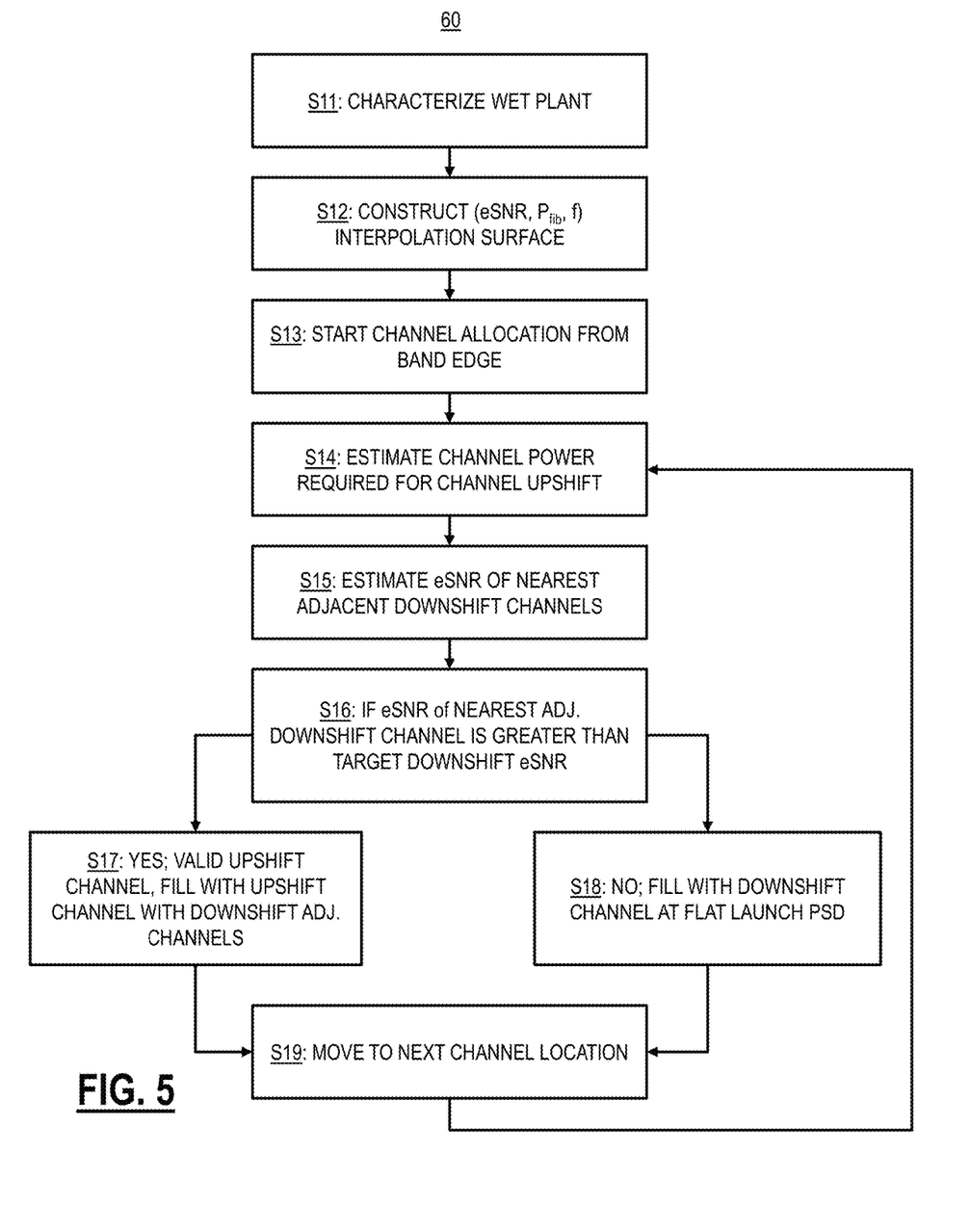
FIG. 5 is a flowchart of a Net System Margin (NSM) process.

FIG. 5 is a flowchart of a Net System Margin (NSM) process 60. The NSM process 60 can be implemented as a method including steps, via the controller 30 executing the steps, and as a non-transitory computer-readable medium having instructions stored thereon for programming a computer or other type of processing device to perform the steps. The NSM process 60 utilizes various aspects of the process 40 and is described, for illustration purposes, with reference to a submarine system. The inputs to the NSM process 60 include probe frequency, Tx power, Rx power, eSNR, and baud (spectral occupancy), target upshift eSNR, target downshift eSNR, target upshift (spectral occupancy), and target downshift baud (spectral occupancy). Again, the probe is one of the modems 26.

The process 60 includes characterizing the wet plant (step S11). This is done under full-fill, flat launch conditions (i.e., with ASE or bulk-modulated channel power holders). This further includes sweep a group of channels along the entire channel plan; capturing performance metrics of middle (non-edge) channels to avoid filter penalties, denoted as the probe channels; and, for a subset of probe frequencies (e.g., at least 7), performing a single channel power hunt.

The process 60 includes constructing a (eSNR, $P_{fib}$, frequency (f)) interpolation surface (step 12). A scattered linear interpolation can be used, such as the Delaunay triangulation algorithm. This further includes calculating $$\frac{dP_{Rx}(P_{Tx}, f_i)}{dP_{Tx}}$$

The process 60 includes starting a channel allocation from the band edge (step S13). That is, start channel allocation from the spectrum edge with the highest $$\frac{dP_{Rx}(P_{Tx}, f_i)}{dP_{Tx}}.$$

The first channel allocated is a downshift channel at a flat launch PSD.

Next, the process 60 includes steps to determine capacity optimization. Upshift channel allocation is based on estimating the channel power required to achieve the target upshift eSNR (step S14) and reducing the channel power of nearest adjacent channels by the same amount (split evenly) (step S15).

A valid condition (step S16) for upshifting a channel is met when the estimated eSNR from its nearest adjacent channels after power change are above the target downshift eSNR (step S17), else fill the spectrum with a downshift channel at flat launch PSD (i.e., "do nothing") (step S18). These steps are continued until the entire spectrum is filled (step S19).

Power Experiments

Figure 6:
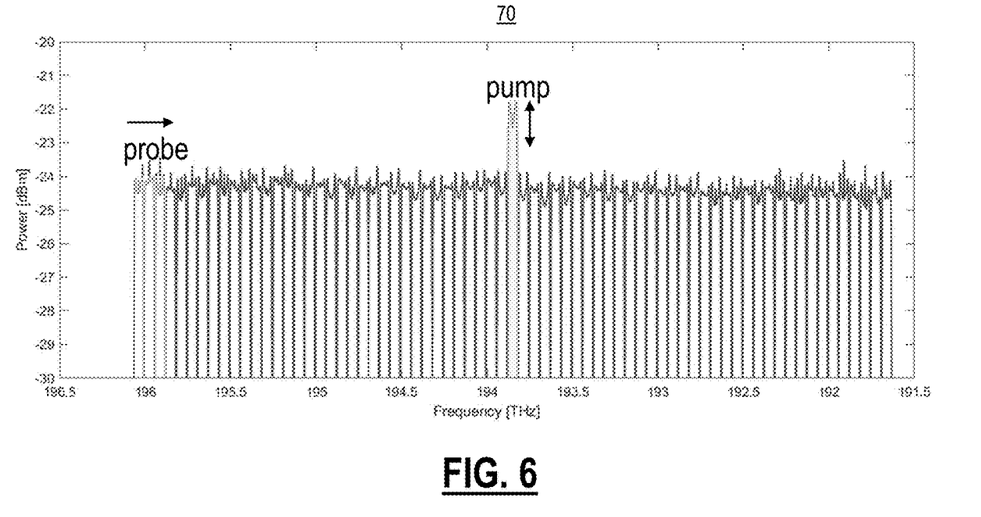
FIG. 6 is a graph of PSD over frequency illustrating a pump and a probe.

FIG. 6 is a graph 70 of PSD over frequency illustrating a pump and a probe. The pump is a channel that varies in power, i.e., is perturbed at the input for a measurement. The probe is a channel (from a modem 26) that is swept (moved) across the band, being swapped for the power of ASE or bulk modulated channels. In this manner, measurements are obtained for the black box optical system 10 for determining the Jacobian matrix.

Figure 7:
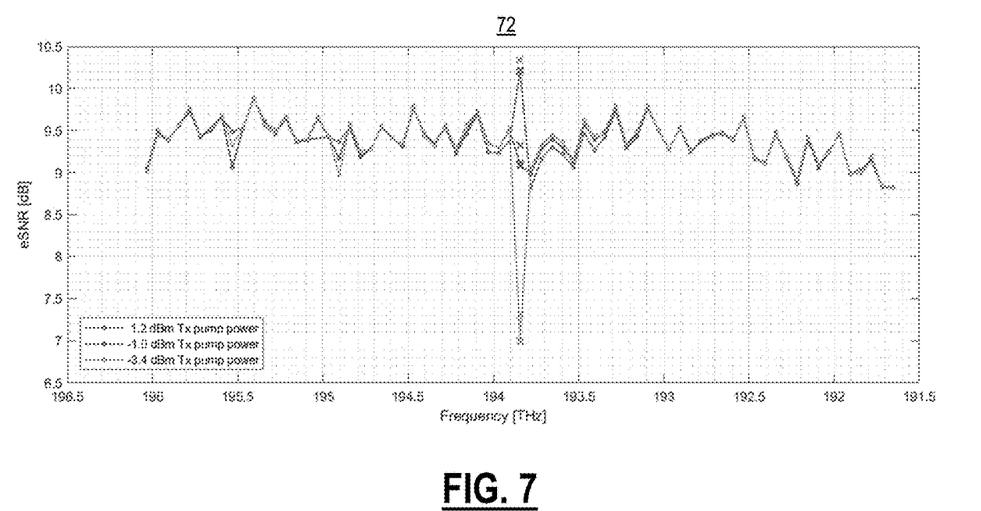
FIG. 7 is a graph of effective SNR (eSNR) over frequency illustrating results for a 56 Gbaud, 200 Gb/s probe signal.

FIG. 7 is a graph 72 of eSNR over frequency illustrating results for a 56 Gbaud, 200 Gb/s probe signal. In the graph 72, the pump is denoted by "x" markers. The pump "outliers" are due to its neighboring channels being replaced by probes (i.e., real channels) during the sweep. The sawtooth shape is likely from the middle probe experiencing less penalty from real channel neighbors.

Figure 8:
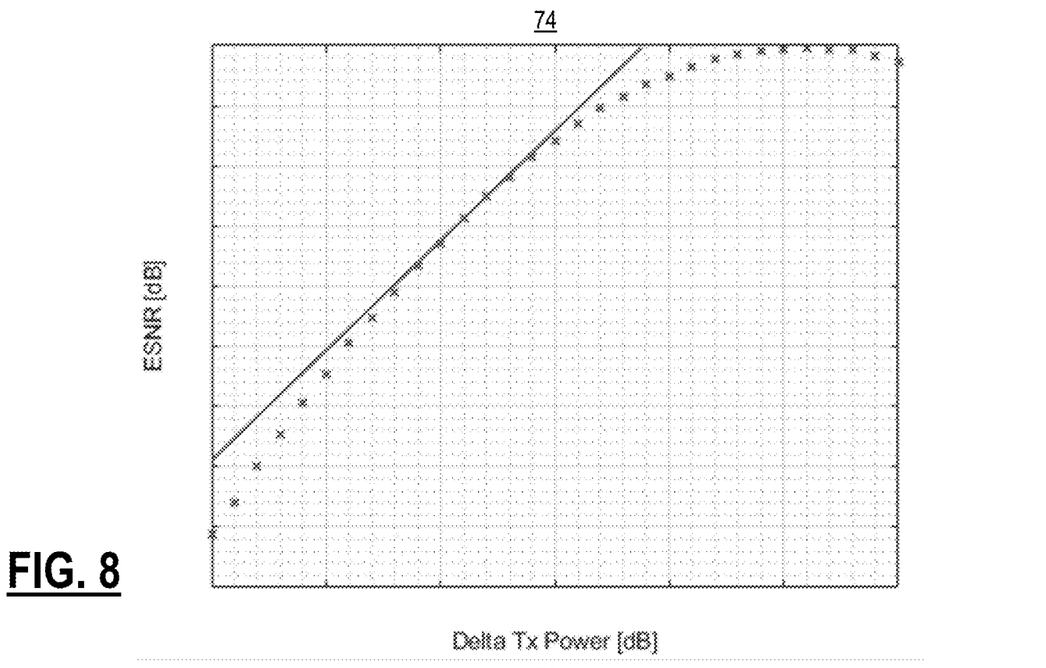
FIG. 8 is a graph of eSNR versus Tx pump power.
Figure 9:
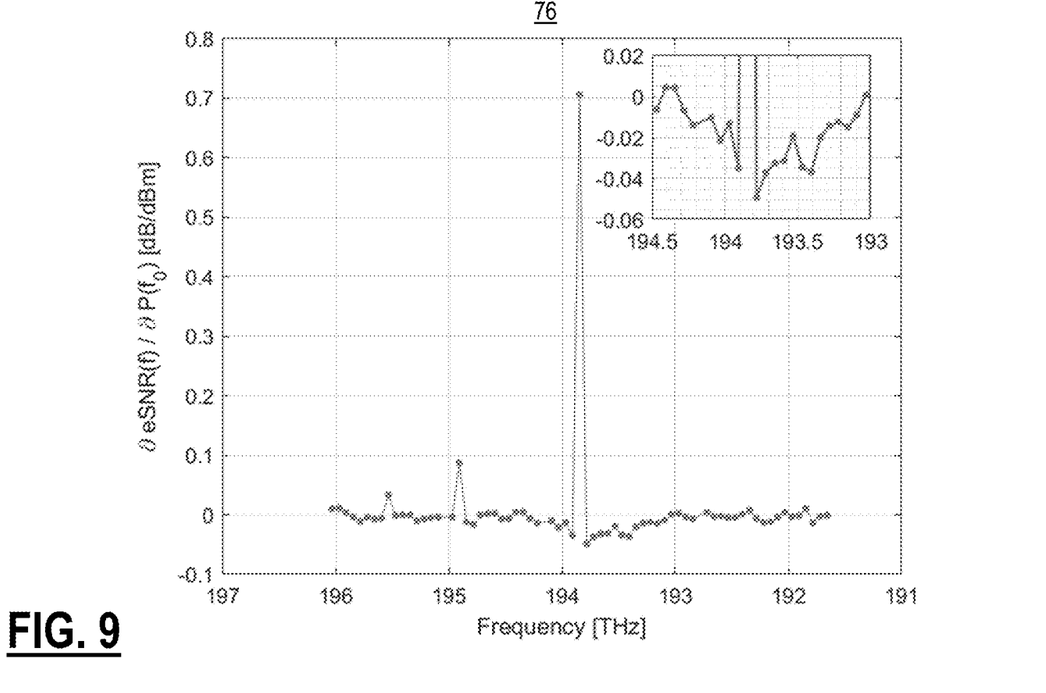

FIG. 8 is a graph 74 of eSNR versus Tx pump power with a tangent illustrating $$\frac{deSNR(f)}{dP(f_o)}$$

at a given pump power. FIG. 9 is a graph 76 of $$\frac{deSNR(f)}{dP(f_o)}$$

over frequency.

$$\frac{deSNR(f)}{dP(f_o)}$$

is taken from the slope of the tangent of eSNR(f) as a function of $P(f_o)$ at a given pump power, where $f_o$ is the pump frequency.

Process

Figure 10:
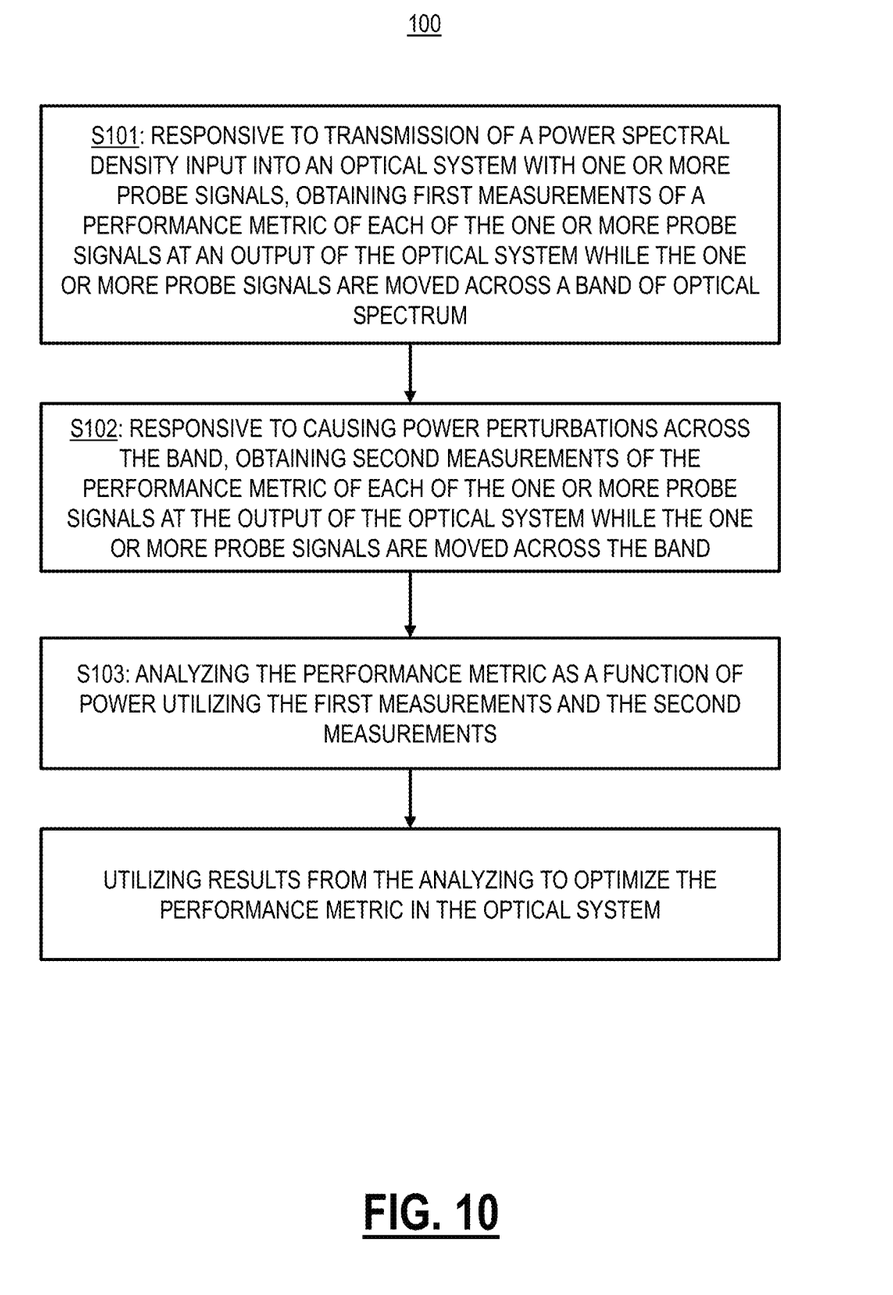
FIG. 10 is a flowchart of a process for power optimization of point-to-point optical systems without visibility of intermediate system parameters.

FIG. 10 is a flowchart of a process 100 for power optimization of point-to-point optical systems without visibility of intermediate system parameters. The process 100 can be implemented as a method including steps, via the controller 30 executing the steps, and as a non-transitory computer-readable medium having instructions stored thereon for programming a computer or other type of processing device to perform the steps.

The process 100 includes, responsive to transmission of a power spectral density input into an optical system with one or more probe signals, obtaining first measurements of a performance metric of each of the one or more probe signals at an output of the optical system while the one or more probe signals are moved across a band of optical spectrum (step S101); responsive to causing power perturbations across the band, obtaining multiple measurements of the performance metrics of each of the one or more probe signals at the output of the optical system while the one or more probe signals are moved across the band (step S102); analyzing the performance metric as a function of power utilizing the first measurements and the second measurements (step S103); and utilizing results from the analyzing to optimize the performance metric in the optical system (step S104). For example, the analyzing can include determining multiple Jacobian matrices (iteratively for each channel upgrade candidate) of the performance metric as a function of power utilizing the first measurements and the second measurements, and the Jacobian matrices can be used to optimize the performance metric in the optical system. Note, it is not necessary to create the entire Jacobian matrices.

The performance metric includes any of end-to-end channel powers, Signal-to-Noise Ratio (SNR), Noise-to-Signal Ratio (NSR), Bit Error Rate (BER), Q factor, Mean Squared Error (MSE) related to compensation, or any other channel-specific performance indicator. Specifically, the performance metric is measured by the one or more probe signals, i.e., at the corresponding modem 26, and the data is used to construct each Jacobian matrix. The previous description utilized SNR or eSNR as the performance metric, but those skilled in the art will recognize this can be any channel-specific performance indicator.

The performance metric can relate to Signal-to-Noise Ratio (SNR), and the utilizing step S104 can include determining approximate power change per channel to increase margin to a next available capacity; and determining net system performance impact across all channels based on the approximate power change.

Also, the performance metric can relate to Signal-to-Noise Ratio (SNR), and the utilizing step S104 can include upshifting a channel when SNR for its adjacent channels are above a target SNR after a power change that is required for the upshifting. The utilizing step S104 can further include repeating the upshifting across the band where possible.

In an embodiment, the intermediate system parameters of the optical system are unknown or inaccessible, and wherein the intermediate system parameters related to an intermediate system that connects one node to another node and includes one or more optical amplifiers. In another embodiment, the optical system includes a submarine system with a wet plant. In a further embodiment, the optical system includes a foreign line system, i.e., a terrestrial line system with different vendors between the terminals and the intermediate system.

In another embodiment, an optical network includes at least one modem connected to a multiplexer connected to an optical system; and a controller configured to cause transmission of a power spectral density input into the optical system with one or more probe signals from the at least one modem, obtain first measurements of a performance metric of each of the one or more probe signals at an output of the optical system while the one or more probe signals are swept across a band of optical spectrum, cause power perturbations across the band, obtain second measurements of the performance metric of each of the one or more probe signals at the output of the optical system while the one or more probe signals are swept across the band during the power perturbations, determine a Jacobian matrix of the performance metric as a function of power utilizing the first measurements and the second measurements, and utilize the Jacobian matrix to determine which channels to prioritize upgrading capacity, and repeat this process to optimize the performance metric across all channels, or as an aggregate in the optical system.

The various processes described herein can be implemented anywhere, including a local Digital Signal Processor (DSP) at a network element, anywhere else at the network element, in a Software Defined Networking (SDN) controller, via orchestration software, etc. The present disclosure creates a transfer function/system response for the black box to perform global optimization of the performance metric. With the transfer function/system response, it is possible to use various optimization techniques such as gradient descent, machine learning, or heuristics to achieve functional minimization or maximization of the performance metric. Also, this approach allows prediction, optimization, and control of the optical system's state to channel adds, deletes, maintenance, protection, and conditioning, without having any visibility of the intermediate system parameters.

Example Processing Device

Figure 11:
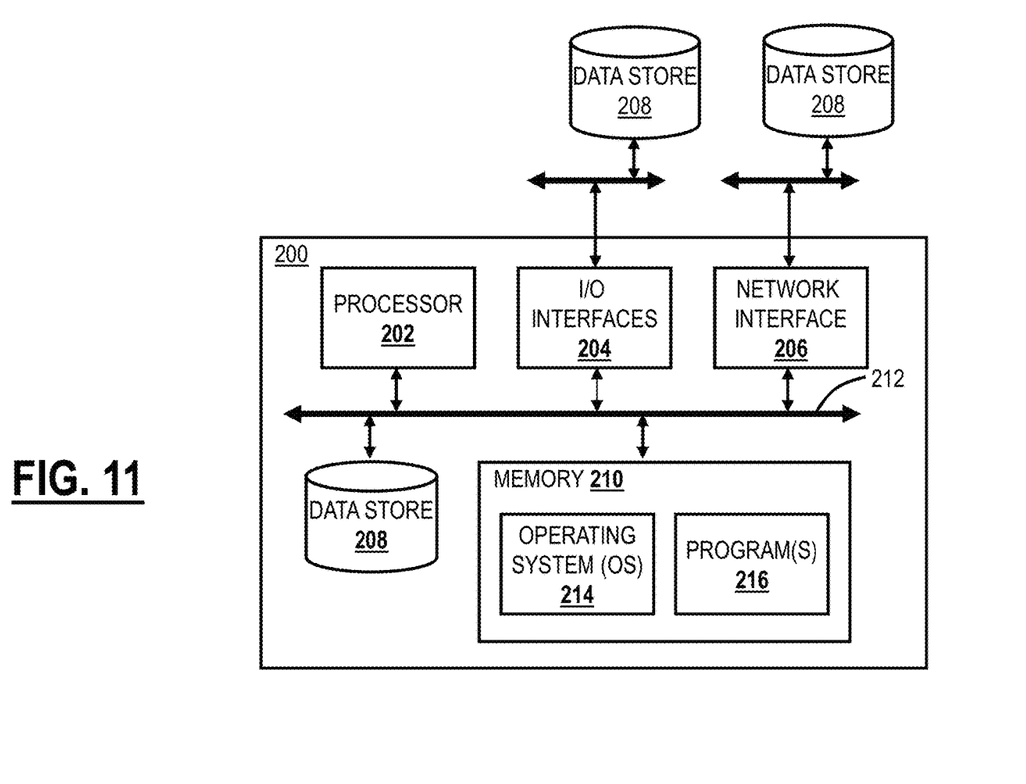
FIG. 11 is a block diagram of a controller.

FIG. 11 is a block diagram of a controller 30. The controller 30 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 11 depicts the controller 30 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the controller 30, a semiconductor-based microprocessor (in the form of a microchip or chipset), or generally any device for executing software instructions. When the controller 30 is in operation, the processor 202 is configured to execute software stored within the memory 210, to communicate data to and from the memory 210, and to generally control operations of the controller 30 pursuant to the software instructions. The I/O interfaces 204 may be used to receive user input from and/or for providing system output to one or more devices or components.

The network interface 206 may be used to enable the controller 30 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the controller 30, such as, for example, an internal hard drive connected to the local interface 212 in the controller 30. Additionally, in another embodiment, the data store 208 may be located external to the controller 30 such as, for example, an external hard drive connected to the I/O interfaces 204 (e.g., SCSI or USB connection). In a further embodiment, the data store 208 may be connected to the controller 30 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable medium having instructions stored thereon for programming a controller to perform steps of:
responsive to transmission of a power spectral density input into an optical system with one or more probe signals, obtaining first measurements of a performance metric of each of the one or more probe signals at an output of the optical system while the one or more probe signals are moved across a band of optical spectrum;
responsive to causing power perturbations across the band, obtaining second measurements of the performance metric of each of the one or more probe signals at the output of the optical system while the one or more probe signals are moved across the band;
analyzing the performance metric as a function of power utilizing the first measurements and the second measurements; and
utilizing results from the analyzing the performance metric for determining settings in the optical system.

2. The non-transitory computer-readable medium of claim 1, wherein the performance metric includes any of end-to-end channel powers, Signal-to-Noise Ratio (SNR), Noise-to-Signal Ratio (NSR), Bit Error Rate (BER), Q-factor, and Mean Squared Error (MSE).

3. The non-transitory computer-readable medium of claim 1, wherein the performance metric relates to Signal-to-Noise Ratio (SNR), and wherein the utilizing includes
determining approximate power change per channel to increase margin to a next available capacity; and
determining net system performance impact across all channels based on the approximate power change.

4. The non-transitory computer-readable medium of claim 1, wherein the performance metric relates to Signal-to-Noise Ratio (SNR), and wherein the utilizing includes
upshifting a channel when SNR for adjacent channels of the one or more probe signals are above a target SNR after a power change that is required for the upshifting.

5. The non-transitory computer-readable medium of claim 4, wherein the utilizing further includes
repeating the upshifting across the band.

6. The non-transitory computer-readable medium of claim 1, wherein intermediate system parameters of the optical system are unknown or inaccessible, and wherein the intermediate system parameters related to an intermediate system that connects one node to another node and includes one or more optical amplifiers.

7. The non-transitory computer-readable medium of claim 1, wherein the optical system includes a submarine system with a wet plant.

8. The non-transitory computer-readable medium of claim 1, wherein the optical system includes a foreign line system where knowledge of intermediate system parameters is unknown or inaccessible.

9. A method comprising the steps of:
responsive to transmission of a power spectral density input into an optical system with one or more probe signals, obtaining first measurements of a performance metric of each of the one or more probe signals at an output of the optical system while the one or more probe signals are moved across a band of optical spectrum;
responsive to causing power perturbations across the band, obtaining second measurements of the performance metric of each of the one or more probe signals at the output of the optical system while the one or more probe signals are moved across the band;
analyzing the performance metric as a function of power utilizing the first measurements and the second measurements; and
utilizing results from the analyzing the performance metric for determining settings in the optical system.

10. The method of claim 9, wherein the performance metric includes any of end-to-end channel powers, Signal-to-Noise Ratio (SNR), Noise-to-Signal Ratio (NSR), Bit Error Rate (BER), Q-factor, and Mean Squared Error (MSE).

11. The method of claim 9, wherein the performance metric relates to Signal-to-Noise Ratio (SNR), and wherein the utilizing includes
determining approximate power change per channel to increase margin to a next available capacity; and
determining net system performance impact across all channels based on the approximate power change.

12. The method of claim 9, wherein the performance metric relates to Signal-to-Noise Ratio (SNR), and wherein the utilizing includes
upshifting a channel when SNR for adjacent channels of the one or more probe signals are above a target SNR after a power change that is required for the upshifting.

13. The method of claim 12, wherein the utilizing further includes
repeating the upshifting across the band.

14. The method of claim 9, wherein intermediate system parameters of the optical system are unknown or inaccessible, and wherein the intermediate system parameters related to an intermediate system that connects one node to another node and includes one or more optical amplifiers.

15. The method of claim 9, wherein the optical system includes a submarine system with a wet plant.

16. The method of claim 9, wherein the optical system includes a foreign line system where knowledge of intermediate system parameters is unknown or inaccessible.

17. An optical network comprising:
at least one modem connected to a multiplexer connected to an optical system; and
a controller configured to
cause transmission of a power spectral density input into the optical system with one or more probe signals from the at least one modem,
obtain first measurements of a performance metric of each of the one or more probe signals at an output of the optical system while the one or more probe signals are moved across a band of optical spectrum,
cause power perturbations across the band,
obtain second measurements of the performance metric of each of the one or more probe signals at the output of the optical system while the one or more probe signals are moved across the band during the power perturbations,
analyze the performance metric as a function of power utilizing the first measurements and the second measurements, and
utilize results from the analyzing the performance metric for determining settings in the optical system.

18. The optical network of claim 17, wherein the performance metric includes any of end-to-end channel powers, Signal-to-Noise Ratio (SNR), Noise-to-Signal Ratio (NSR), Bit Error Rate (BER), Q-factor, and Mean Squared Error (MSE).

19. The optical network of claim 17, wherein intermediate system parameters of the optical system are unknown or inaccessible, and wherein the intermediate system parameters related to an intermediate system that connects one node to another node and includes one or more optical amplifiers.

20. The optical network of claim 17, wherein the optical system includes a submarine system with a wet plant.

* * * * *